(12) United States Patent
Hall et al.

(10) Patent No.: US 7,762,364 B2
(45) Date of Patent: Jul. 27, 2010

(54) HYBRID VEHICLE

(76) Inventors: David R. Hall, 2185 S. Larsen Pkwy., Provo, UT (US) 84606; Scott Dahlgren, 2185 S. Larsen Pkwy., Provo, UT (US) 84606

( * ) Notice: Subject to any disclaimer, the term of this patent is extended or adjusted under 35 U.S.C. 154(b) by 424 days.

(21) Appl. No.: 11/934,214

(22) Filed: Nov. 2, 2007

(65) Prior Publication Data
US 2009/0114195 A1    May 7, 2009

(51) Int. Cl.
*B60K 6/20* (2007.10)
(52) U.S. Cl. .................................. 180/65.21; 180/68.3
(58) Field of Classification Search ............. 180/65.21, 180/68.1, 68.3, 165, 65.265, 65.8; 62/426, 62/296, 241; 60/600, 605.1, 606; 123/585, 123/586, 545, 579
See application file for complete search history.

(56) References Cited

U.S. PATENT DOCUMENTS

| | | | |
|---|---|---|---|
| 2,698,613 A * | 1/1955 | Jagersberger ............... 123/545 |
| 3,783,610 A | 1/1974 | Gano | |
| 3,913,699 A | 10/1975 | Dyer | |
| 4,235,209 A * | 11/1980 | Ibbott ......................... 123/585 |
| 4,290,268 A | 9/1981 | Lowther | |
| 4,590,767 A | 5/1986 | Gardner, Jr. | |
| 4,658,781 A | 4/1987 | Guinea | |
| 4,798,053 A | 1/1989 | Chang | |
| 5,066,317 A | 11/1991 | Gross et al. | |
| 5,121,607 A | 6/1992 | George, Jr. | |
| 5,125,469 A | 6/1992 | Scott | |
| 5,529,549 A | 6/1996 | Moyer | |
| 5,549,174 A | 8/1996 | Reis | |
| 6,279,550 B1 | 8/2001 | Bryant | |
| 6,488,345 B1 | 12/2002 | Woody | |
| 6,536,420 B1 | 3/2003 | Cheng | |
| 6,922,997 B1 | 8/2005 | Larson et al. | |
| 6,951,211 B2 | 10/2005 | Bryant | |
| 7,076,952 B1 | 7/2006 | Vetrovec | |
| 7,143,596 B2 | 12/2006 | Yonekura et al. | |
| 7,260,947 B1 | 8/2007 | Harrison | |
| 7,640,744 B2 * | 1/2010 | Rollinger et al. ........... 60/605.1 |
| 7,654,085 B2 * | 2/2010 | Dumas et al. ................. 60/606 |
| 2003/0213252 A1 | 11/2003 | Kuribayashi | |
| 2007/0119169 A1 * | 5/2007 | Berger et al. .................. 60/600 |
| 2009/0248204 A1 * | 10/2009 | Kikuchi et al. ................ 62/426 |

* cited by examiner

*Primary Examiner*—Hau V Phan
(74) *Attorney, Agent, or Firm*—Tyson J. Wilde; Derek J. Battisti

(57) ABSTRACT

A hybrid vehicle comprises a deceleration mechanism adapted to decelerate a wheel of the vehicle and adapted to drive an air compressor attached to the vehicle from the wheel deceleration. An engine of the vehicle comprises at least one cylinder assembly having a cylinder with an air in-take opening, and the cylinder assembly being adapted to rotate at least in part a crankshaft which is adapted to apply torque to the wheel of the vehicle. An air passage connects the compressor directly to the in-take opening, and the compressor comprises a flow regulator adapted to control an amount of air which passes from the compressor into the cylinder through the in-take valve.

17 Claims, 7 Drawing Sheets

HYBRID VEHICLE

BACKGROUND OF THE INVENTION

Most vehicles dissipate kinetic energy during braking through friction brakes and engine compression braking, rather than capturing and storing the energy for reuse. It is widely recognized that this is a very wasteful use of energy, and recapture of the energy for accelerating the vehicle from is advantageous.

U.S. Pat. No. 6,279,550 to Bryant, which is herein incorporated by reference for all that it contains discloses a method of deriving mechanical work from a combustion gas in internal combustion engines and reciprocating internal combustion engines for carrying out the method. The invention includes methods an apparatuses for managing combustion charge densities, temperatures, pressures and turbulences in order to produce a true mastery within the power cylinder in order to increase fuel economy, power, and torque while minimizing polluting emissions.

U.S. Pat. No. 6,922,997 to Larsen, which is herein incorporated by reference for all that it contains discloses a motor vehicle kinetic energy recovery system that uses one or more cylinders of an internal combustion engine as the first or primary stage in a multi-stage high pressure air compression system, a compressed air storage system, compressed air operated drive train boosters and vehicle management electronics to provide cooperation between the air compression, storage and booster systems. The multi-stage, high pressure air compressor system is operable through engine compression braking allowing kinetic energy of a vehicle to be recaptured during retardation of vehicle speed.

U.S. Pat. No. 6,488,345 to Woody et al., which is herein incorporated by reference for all that it contains discloses a regenerative braking system and method for a batteriless fuel cell vehicle includes a fuel cell stack, a plurality of ancillary loads, and a regenerative braking device that is coupled to at least one wheel of the vehicle. The regenerative braking device powers ancillary loads when the vehicle is coasting or braking. The fuel cell powers the loads when the vehicle is accelerating or at constant velocity. The regenerative braking device dissipates power in an air supply compressor when the vehicle is traveling downhill to provide brake assistance. The compressor can be run at high airflow and high pressure to create an artificially high load. A bypass valve is modulated to adjust the artificially high load of the compressor. A back pressure valve protects the fuel cell stack from the high airflow and pressure. A controller controls a brake torque of the regenerative braking device as a function of vehicle speed and modulates the bypass valve.

BRIEF SUMMARY OF THE INVENTION

A hybrid vehicle comprises a deceleration mechanism adapted to decelerate a wheel of the vehicle and adapted to drive an air compressor attached to the vehicle from the wheel deceleration. An engine of the vehicle comprises at least one cylinder assembly having a cylinder with an air in-take opening, and the cylinder assembly being adapted to rotate at least in part a crankshaft which is adapted to apply torque to the wheel of the vehicle. An air passage connects the compressor directly to the in-take opening, and the compressor comprises a flow regulator adapted to control an amount of air which passes from the compressor into the cylinder through the in-take valve.

The passage of the vehicle may comprise an expansion region which may allow for a decrease in pressure to the compressed air along with a decrease in temperature. The passage may also comprise an expandable region adapted to regulate the volume of air that passes through it. The deceleration mechanism may be connected to an electronic sensor that causes the deceleration mechanism to move into contact with the wheel to decelerate the wheel. The deceleration mechanism may comprise a clutch plate that is in fluid or mechanical communication with the wheel during deceleration. The deceleration mechanism may also be in fluid or mechanical communication with a differential of the vehicle. The deceleration mechanism may also be in communication with a telescoping mechanism which moves at least a portion of the deceleration mechanism in and out of contact with a portion of the vehicle. The deceleration mechanism may be in contact with a generator that may power the compressor. The deceleration mechanism may be in communication with a fan element adapted to dissipate heat from the compressor. The deceleration mechanism may be adapted to decelerate an axle to transmit torque to multiple wheels of the vehicle. The deceleration mechanism may be in communication with a brake. The brake may activate the deceleration mechanism during braking. The deceleration mechanism may comprise a clutch plate that moves in and out of contact with a wheel of the vehicle, an axle, a differential, a drive shaft, or a combination thereof. The deceleration mechanism may comprise a cam adapted to power the compressor during deceleration.

The amount of air entering the cylinder from the compressor may be pressurized, and colder than ambient air outside of the vehicle. An outer surface of the compressor may comprise cooling fins adapted to dissipate heat from the compressing of the air. The compressor may comprise a pump that is powered by the deceleration mechanism. The compressor may comprise an outlet adapted to direct air from the compressor to a cooling system of the vehicle, and may be adapted to pressurize the air to at least 500 psi. The compressor may draw air from the ambient air or from an exhaust system of the vehicle. The compressor may be selected from the group consisting of reciprocating compressors, rotary screw compressors, axial-flow compressors, centrifugal compressors, mixed-flow compressors, scroll compressors, or combinations thereof. The flow regulator may comprise an electronic sensor and may be in electrical communication with a throttle of the engine. The compressor may be in communication with an accumulator adapted to store compressed air. The accumulator may be in communication with the cylinder of the engine.

In another aspect of the invention, a method comprising the steps of providing a deceleration mechanism in communication with a compressor adapted to be in contact with a wheel during deceleration; the deceleration mechanism indirectly or directly powering an air compressor. The method further comprises a step of transferring air from the air compressor to an accumulator, and allowing the air to go through a passage into an expansion chamber or intercooler creating a drop in pressure and temperature. The method further comprises a step of supercharging the engine by passing the air from the expansion chamber into cylinders of the engine.

DETAILED DESCRIPTION OF THE INVENTION AND THE PREFERRED EMBODIMENT

Figure 1:
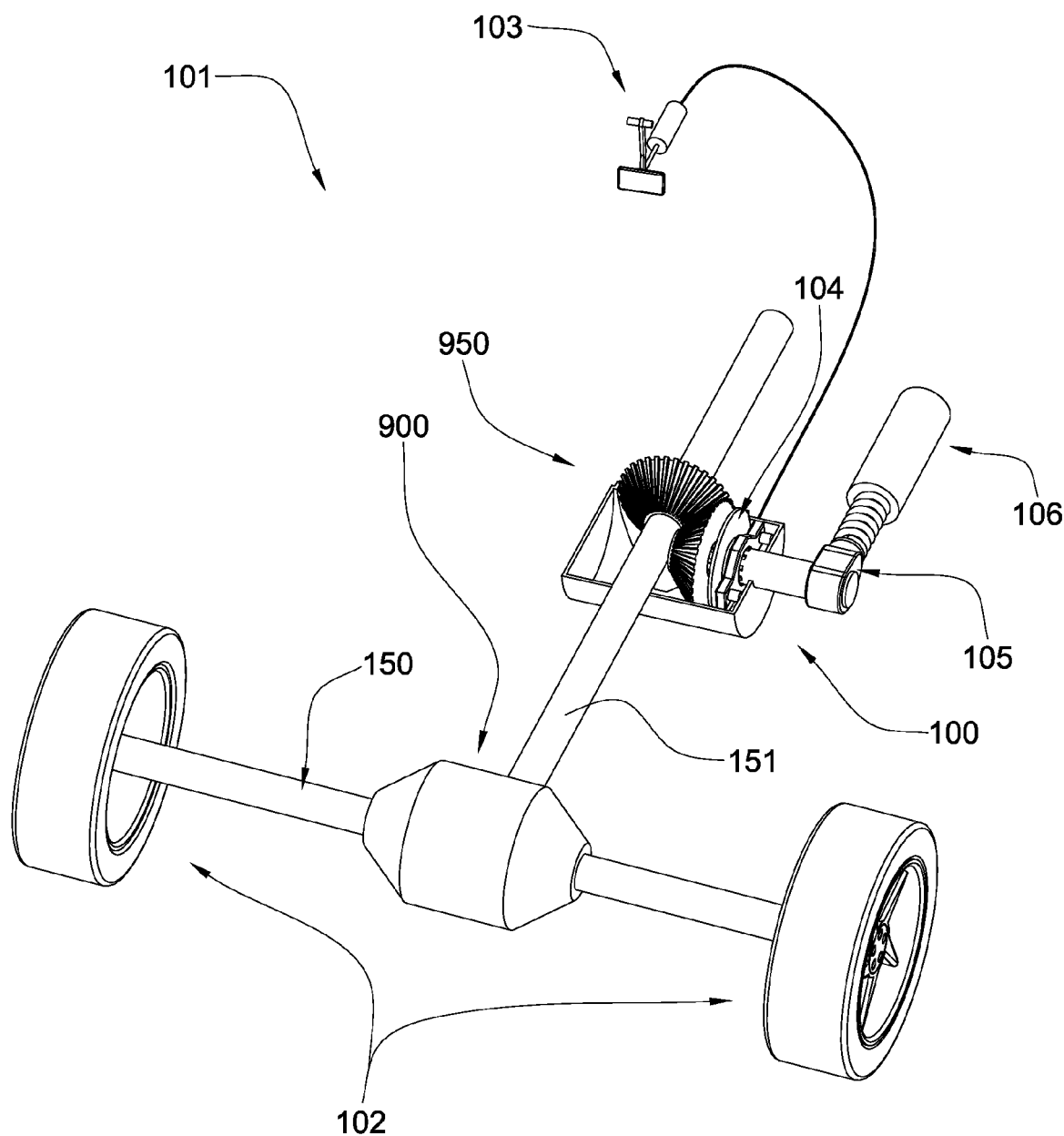
FIG. 1 is a perspective diagram of a deceleration mechanism.

FIG. 1 is a perspective diagram of a deceleration mechanism 100 within a vehicle 101. The vehicle 101 may comprise wheels 102 attached to an axle 150 and a drive shaft 151 through a differential 900. The deceleration mechanism 100 may be in communication with a hydraulic brake 103. The deceleration mechanism 100 may comprise a clutch plate 104. The brake 103 may activate the clutch plate 104 to decelerate the vehicle. The clutch plate 104 may move into contact with a gear set 950 driven off of the drive shaft which retards the rotational velocity of the drive shaft and thereby slowing the vehicle. The torque from the drive shaft is transmitted through the gear set to a cam 105 causing it to rotate. The cam 105 may contact an air compressor 106 during its rotation actuating the air compressor. The compressor in effect stores the kinetic energy that would have otherwise been wasted during braking. This compressed air may be supplied to the engine to supercharge it. The deceleration mechanism 100 may be in communication with the drive shaft 151, the axle 150, the wheels 102, crankshaft or a combination thereof. In some embodiments, the deceleration mechanism is the primary braking system of the vehicle or it is a supplemental braking system.

Figure 2:
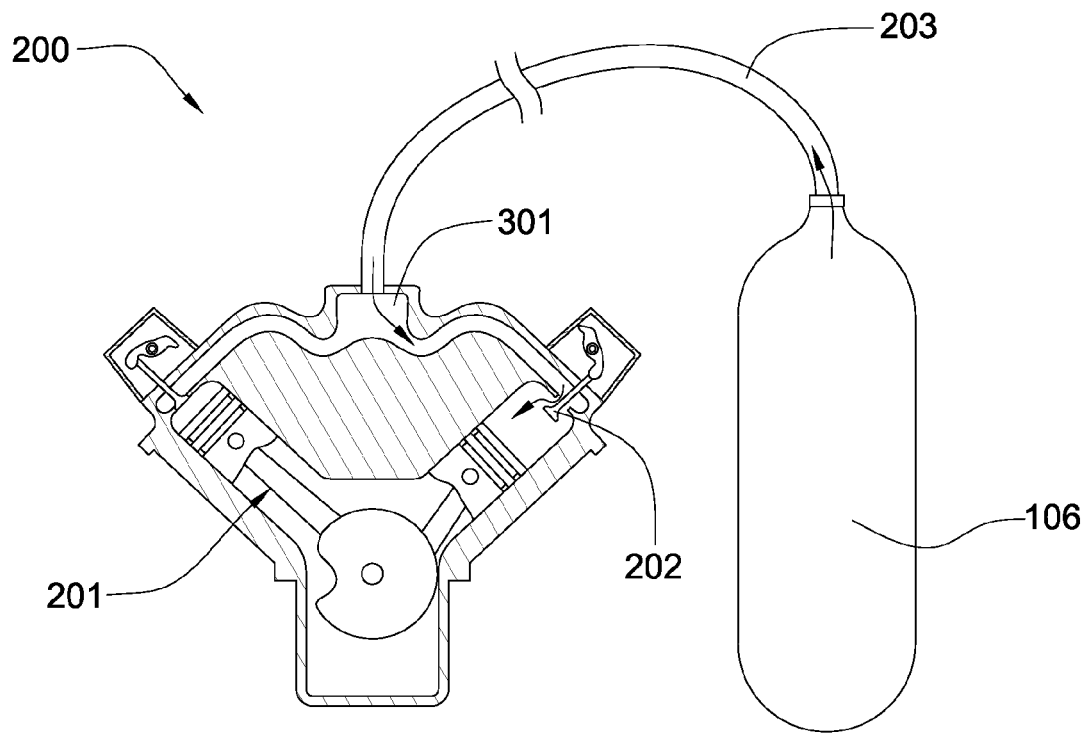
FIG. 2 is a cross-sectional diagram of an embodiment of an engine.

FIG. 2 is a cross-sectional diagram of an engine 200. The engine 200 may comprise a plurality of cylinders 201 and may be in communication with the air compressor 106 via a pathway 203. The pathway 203 may be a hose, a pipe, or a combination thereof. Air from the compressor 106 may enter the engine 200 at in-take opening of the cylinders and thereby supercharge the cylinders. The engine 200 may also comprise valves 202 near the in-take openings of the cylinder 201 that may regulate the amount of compressed air that enters into the cylinders 201. The pathway 203 may comprise an expansion region 301 which may depressurize the air to its optimal pressure and also cool the air before entering the cylinders.

Figure 3:
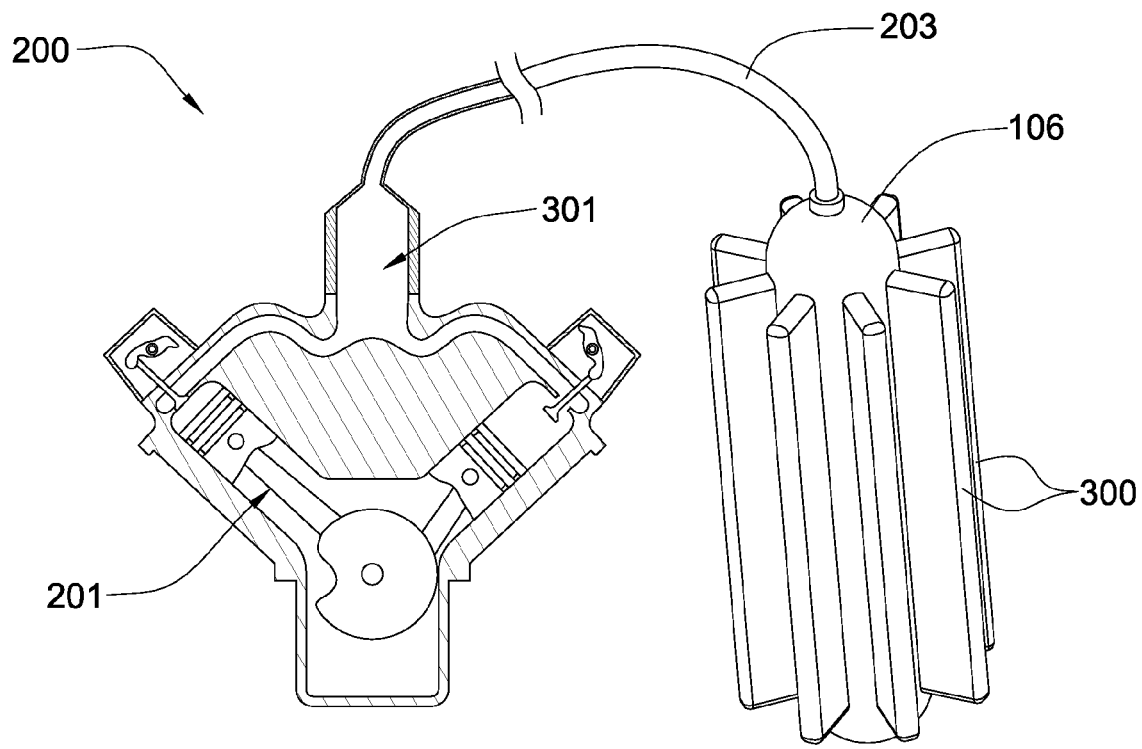
FIG. 3 is a cross-sectional diagram of another embodiment of an engine.

FIG. 3 is a cross-sectional diagram of an engine 200. The compressor 106 may comprise a plurality of fins 300 that may dissipate heat created by pressurizing air allowing the compressed air may be a cooler temperature than the ambient temperature outside of the vehicle (not shown). Other active or passive cooling systems may be used to cool the compressed air. The air may be drawn from the ambient air outside the vehicle during deceleration or the pull may be pulled from the exhaust system.

Figure 4:
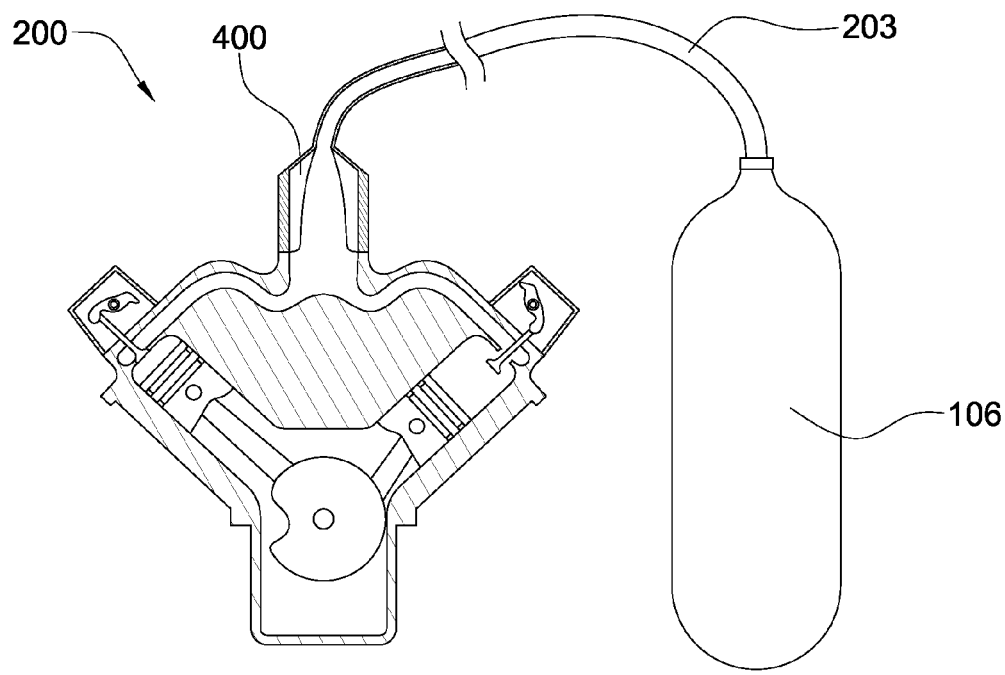
FIG. 4 is a cross-sectional diagram of another embodiment of an engine.

FIG. 4 is another cross-sectional diagram of an engine 200. The pathway 203 may comprise a bladder 400 near the engine 200 that may regulate the flow of compressed air that may pass into the engine 200. The bladder 400 may also be electronically and/or hydraulically controlled.

Figure 5:
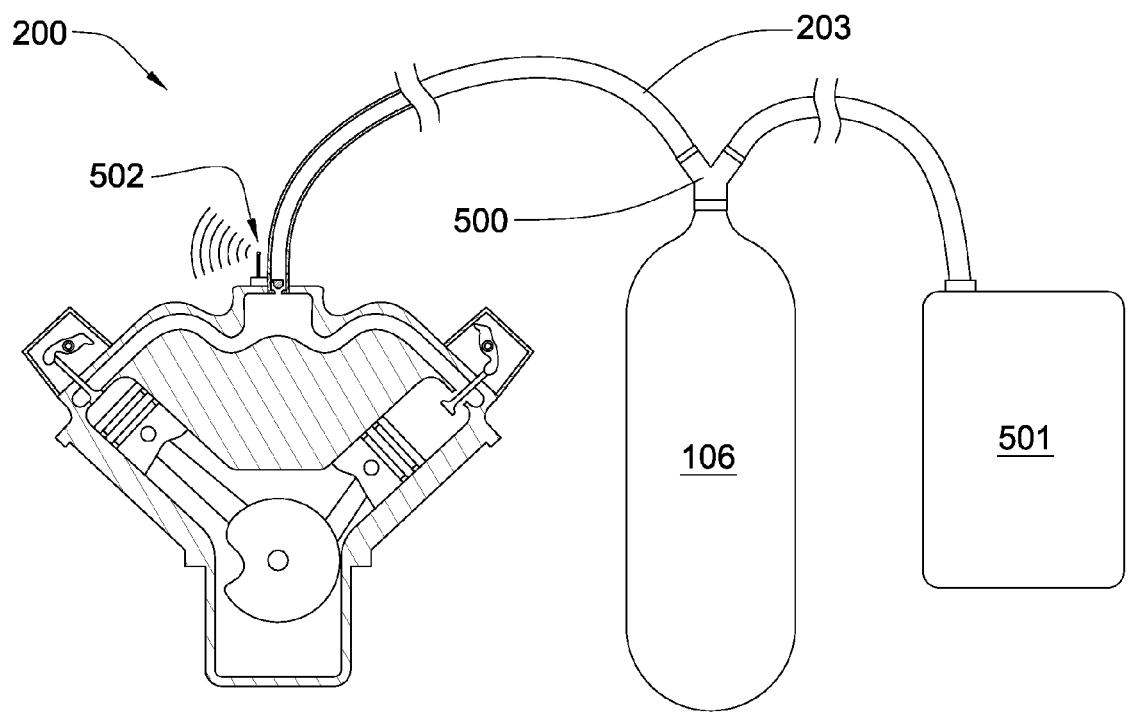
FIG. 5 is a cross-sectional diagram of another embodiment of an engine.

FIG. 5 is another cross-sectional diagram of an engine 200. The compressor 106 may comprise a valve 500. The valve 500 may regulate the amount of air exiting the compressor. The compressor 106 may be in communication with a cooling system 501 for cooling the engine and/or the cab of the vehicle. The engine 200 may comprise an electronic component 502 that electronically regulates the amount of compressed air passing into the engine 200. The electronic component may be hardwired in the vehicle or it may communicate wirelessly with the compressor, valves, brakes and other sensors on the vehicle. The electronic component receives signals from the vehicle that the car is accelerating and thereby increase the air the passes into the cylinders. In some embodiments of the invention the compressed air only enters the cylinders during acceleration while in other embodiments the compressed air may enter the cylinders continuously. In other embodiments, the amount and timing of compressed air entering the cylinders depends on the amount of compressed air in the compressor. In some embodiments, the electronic component sends signals to other components of the vehicle.

Figure 6:
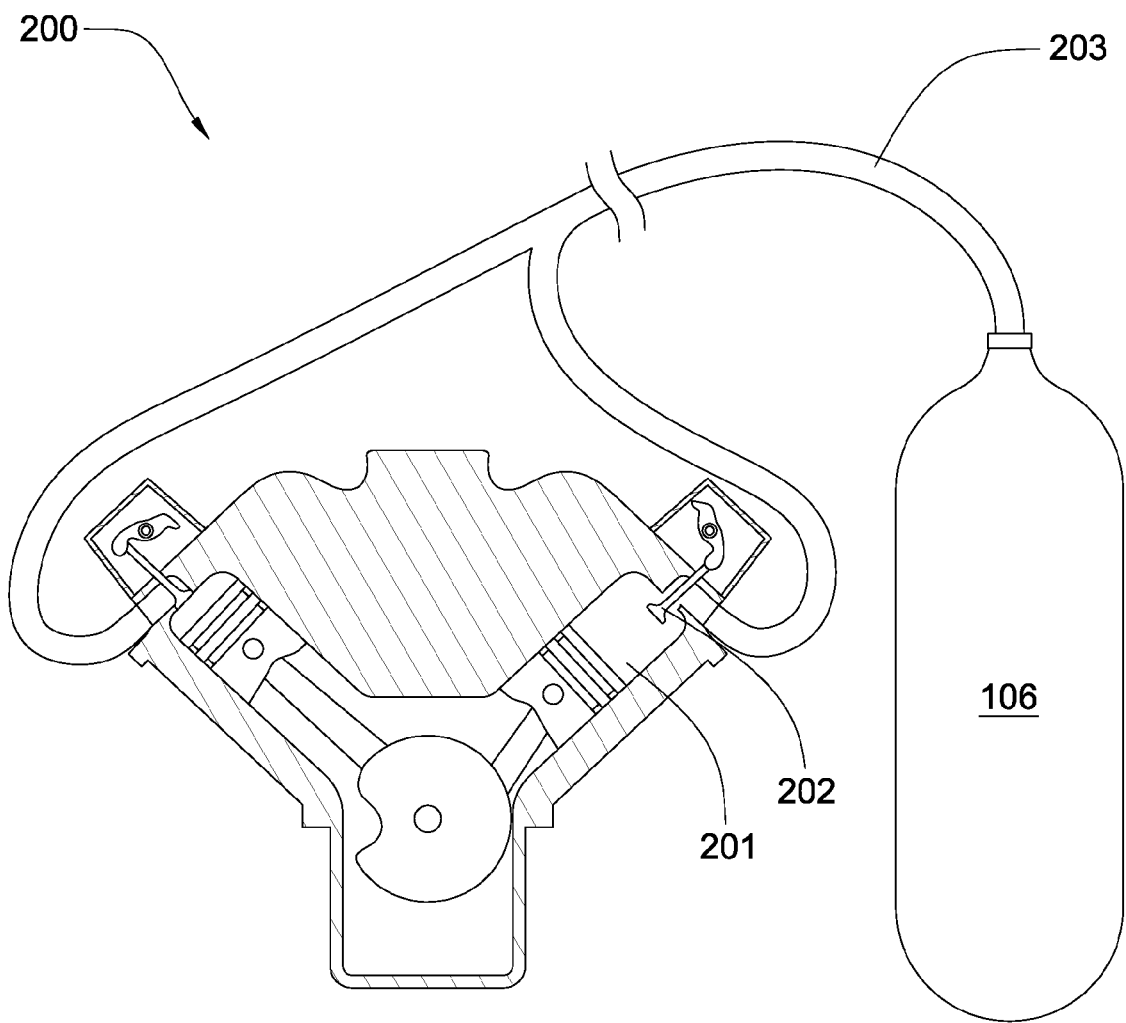
FIG. 6 is a cross-sectional diagram of another embodiment of an engine.

FIG. 6 is another cross-sectional diagram of an engine 200. The engine 200 may be in communication with a compressor 106. The compressor 106 may be in direct communication with the cylinders 201 of the engine 200 through the pathway 203. The compressed air may enter directly into each cylinder 201 and supercharge the engine 200. The engine 200 may comprise a valve 202 that regulates the amount of compressed air entering the cylinders 201.

Figure 7:
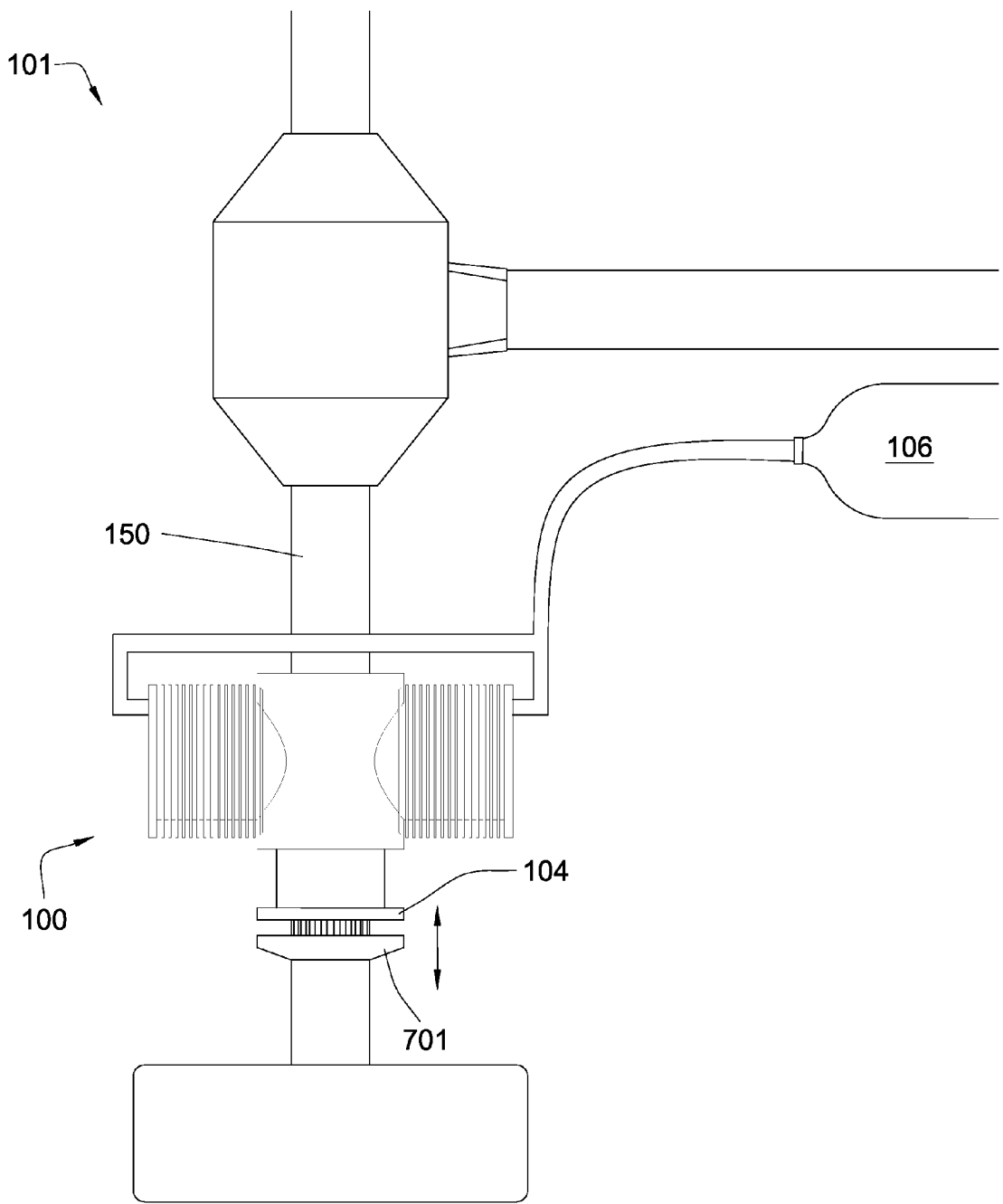
FIG. 7 is another perspective diagram of another embodiment of a deceleration mechanism.

FIG. 7 is another perspective diagram of a deceleration mechanism 100. The deceleration mechanism 100 may be positioned near the axel 150 of the vehicle 101. During braking of the vehicle 101 the clutch plate 104 may telescope into contact with another plate 701 causing torque to be transferred from the wheel 102 to the deceleration mechanism 100. The deceleration mechanism 100 may be in communication with a compressor 106. The compressor 106 may be in contact with an accumulator that may store the compressed air. The compressor 106 may be a reciprocating compressor, an axial flow compressor, a rotary screw compressor, a centrifugal compressor, or a combination thereof.

Figure 8:
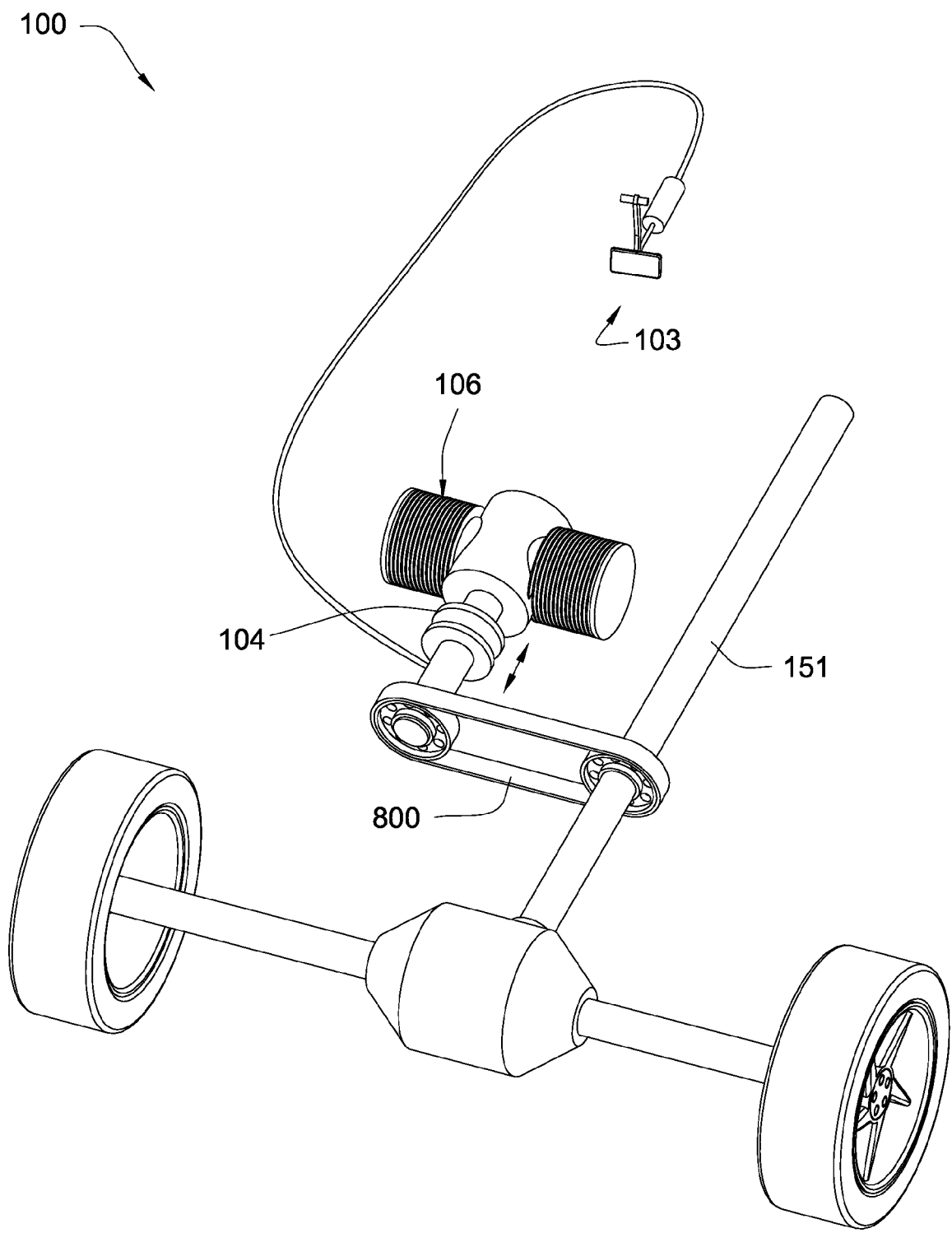
FIG. 8 is another perspective diagram of another embodiment of a deceleration mechanism.

FIG. 8 is another perspective diagram of a deceleration mechanism 100. The deceleration mechanism 100 may be in communication with the drive shaft 151 of the vehicle 101 by a pulley 800. The pulley 800 may rotate a clutch plate 104. A brake 103 may be in communication with the clutch plate 104. During braking the clutch plate 104 may move into contact with a compressor 106 and actuate it.

Figure 9:
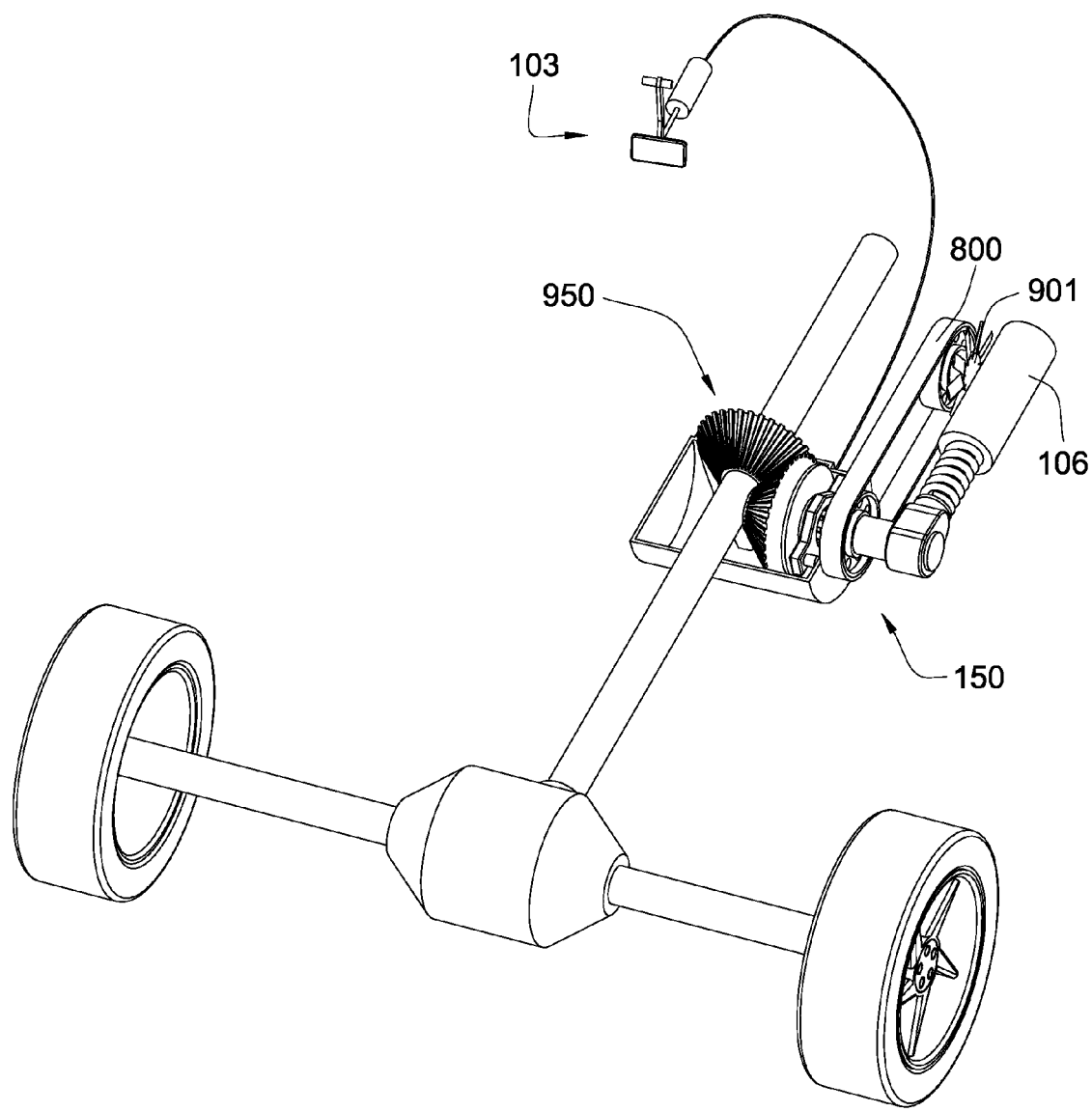
FIG. 9 is another perspective diagram of another embodiment of a deceleration mechanism.

FIG. 9 is another perspective diagram of a deceleration mechanism 100. The deceleration mechanism 100 may be in contact with a brake 103. The brake 103 may activate the deceleration mechanism 100 to move into contact with a gear set 950. The deceleration mechanism 100 may be in communication with a fan element 901 through a pulley 800, chain, gears or combinations thereof. The fan element 901 may dissipate heat given off by the compressor 106 or other components during braking where heat could be an issue. The fan element 901 may be an axial fan, a centrifugal plan, a cross-flow fan, or a combination thereof.

Whereas the present invention has been described in particular relation to the drawings attached hereto, it should be understood that other and further modifications apart from those shown or suggested herein, may be made within the scope and spirit of the present invention.

What is claimed is:

1. A hybrid vehicle, comprising;
  a deceleration mechanism adapted to decelerate a wheel of the vehicle and adapted to drive an air compressor attached to the vehicle from the wheel deceleration;
  an engine of the vehicle comprises at least one cylinder assembly having a cylinder with an air in-take opening;

the cylinder assembly being adapted to rotate at least in part a crankshaft which is adapted to apply torque to the wheel of the vehicle;

an air passage connects the compressor directly to the in-take opening; and the compressor comprises a flow regulator adapted to control an amount of air which passes from the compressor into the cylinder through the in-take valve;

wherein the deceleration mechanism comprises a clutch plate.

2. The vehicle of claim 1, wherein the passage comprises an expansion region.

3. The vehicle of claim 1, wherein the passage comprises an expandable region adapted to regulate the volume of air that passes through the passage.

4. The vehicle of claim 1, wherein the deceleration mechanism is connected to an electronic sensor that actuates the deceleration mechanism.

5. The vehicle of claim 1, wherein the amount of air entering the cylinder is pressurized.

6. The vehicle of claim 1, wherein the amount of air entering the cylinder is colder than ambient air outside of the vehicle.

7. The vehicle of claim 1, wherein an outer surface of the compressor comprises cooling fins adapted to dissipate heat from the compressed air.

8. The vehicle of claim 1, wherein the flow regulator comprises an electronic sensor.

9. The vehicle of claim 1, wherein the deceleration mechanism is in fluid communication with a portion of the vehicle during deceleration.

10. The vehicle of claim 1, wherein the compressor comprises a pump that is mechanically powered by the deceleration mechanism.

11. The vehicle of claim 10, wherein the pump is powered by a rotating cam during deceleration.

12. The vehicle of claim 1, wherein the deceleration mechanism is in communication with a fan element adapted to dissipate heat from the compressor.

13. The vehicle of claim 1, wherein the compressor comprises an outlet adapted to direct air from the compressor to a cooling system of the vehicle.

14. The vehicle of claim 1, wherein the compressor is adapted to pressurize the air to at least 500 psi.

15. The vehicle of claim 1, wherein the deceleration mechanism is adapted to decelerate an axle which transmits torque to multiple wheels of the vehicle.

16. The vehicle of claim 1, wherein the compressor draws air from the ambient air or from an exhaust system of the vehicle.

17. The vehicle of claim 1, wherein the compressor is selected from the group consisting of reciprocating compressors, rotary screw compressors, axial-flow compressors, centrifugal compressors, mixed-flow compressors, scroll compressors and combinations thereof.

* * * * *